Patented Apr. 18, 1944

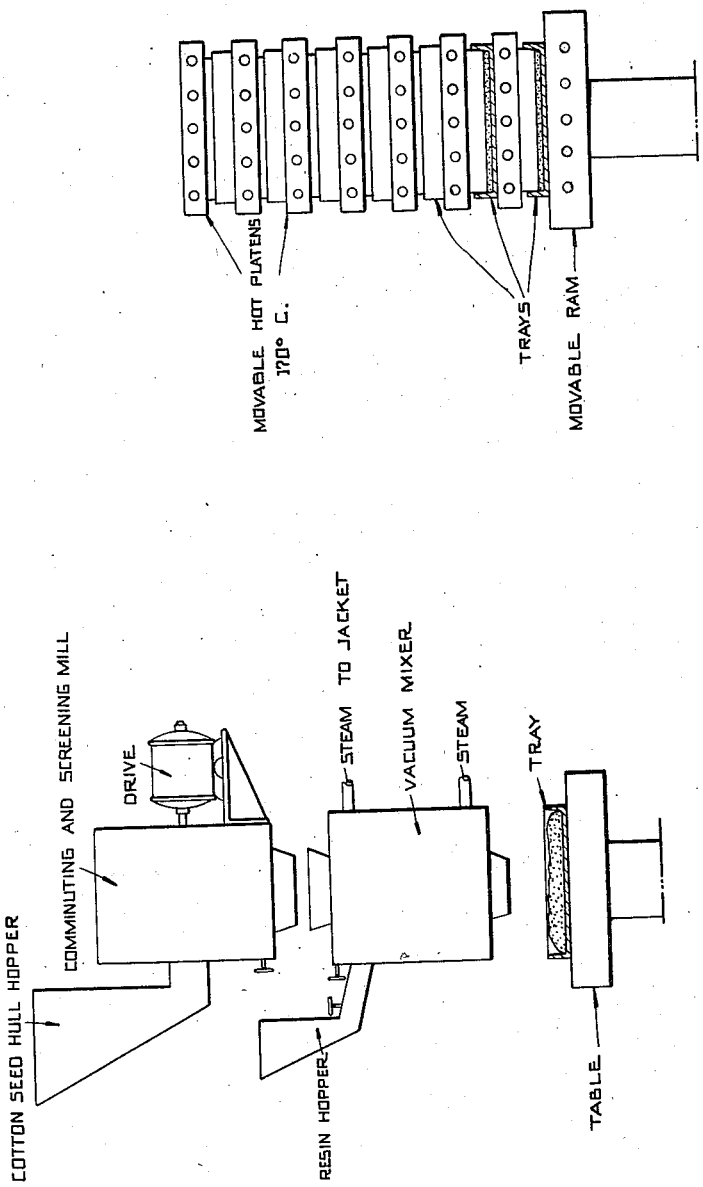

2,346,943

UNITED STATES PATENT OFFICE 2,346,943

FIBERBOARD COMPOSITION

Fritz Rosenthal, Knoxville, Tenn., assignor to The University of Tennessee Research Corporation, Knoxville, Tenn., a corporation of Tennessee Application April 19, 1941, Serial No. 389,468

5 Claims. (Cl. 18—47.5)

This invention relates to an improved fiberboard comprising vegetable fiber products of cellulose and lignin, impregnated with a resinous binder and compounded under the influence of heat and pressure. It has for its object a treatment of the vegetable material to obtain a product of maximum rigidity and strength.

Composition boards possessing rigidity and strength are usually prepared by impregnating paper or canvas with solutions of resinoids in a volatile solvent. Subsequent to drying, the resin content is usually 30 to 50%. The material is then laminated to the desired thickness and subjected to heat and pressure in a hydraulic press. The resinoid when cured under the influence of the heat and pressure is hard and infusible and the resulting product is of maximum rigidity and will resist flexure and other stresses.

I have discovered that comminuted cottonseed hulls may be treated to yield products of great rigidity and strength. Broadly, this treatment consists in comminuting the hulls, impregnating them with a solution of a resinoid, driving off the solvent, and subjecting a layer of the material to heat and pressure.

The hulls may be satisfactorily ground in a hammer mill with $\frac{1}{32}$" screen, or in an attrition or Wyllie mill. Another desirable method is flaking the hulls between rotating rolls.

Comminuted cottonseed hulls have exhibited certain properties which prove them to be well adapted to incorporation in molding compositions with phenolic resin. In the case of a molding composition sufficient resin must be added to the hulls (30–40%) to permit the mixture to flow freely and fill all the crevices of the mold when subjected to heat and pressure. This high ability for flow, however, is undesirable in a composition of the present type. I have discovered that comminuted cottonseed hulls impregnated with less than 20% of phenolic resin and deficient of being a molding composition, reveal certain unique properties when pressed between two heated platens. Under these conditions the composition exhibits sufficient flow to form a sheet of uniform thickness between the platens but not enough flow to squeeze out at the sides where there is no effective pressure. This appears to be an inherent property of cottonseed hulls, as they exhibit the ability for two-dimensional flow even without the incorporation of a resinous binder. The addition of small percentages of phenolic resin to the comminuted hulls enables the sheets to be formed at substantially lower pressures and results in a product of great rigidity and mechanical strength and of improved finish.

With laminated phenolic sheets a pressing temperature of 150° C. has been found to be sufficient to form a finished product. The cottonseed hull compound, on the other hand, produces a much stronger board when pressed at 170° C. or above. This furnishes additional proof that the lignin is instrumental in the formation of the sheet. It is a matter of speculation whether the phenolic resin acts as a plasticizer for the lignin, whether the lignin modifies the resin, whether the lignin and resin form a condensation product, or whether a co-polymerization takes place.

An apparatus by which my method may be performed is illustrated schematically on the accompanying drawing, wherein Fig. 1 shows a comminuting and screening mill with associated drive and cottonseed hull hopper, a steam-jacketed mixer with associated resin hopper and a receiving tray for the comminuted material on a table below the mixer; and Fig. 2 shows a plurality of such trays positioned between platens and a movable ram for elevating the same.

The following is one example of a fiberboard composition incorporating comminuted cottonseed hulls and phenolic resin:

820 grams of cottonseed hulls, comminuted to pass a 100 mesh screen and containing 10% of hull fiber are mixed with 360 grams of an aqueous phenolic resinoid syrup of 50% solid content in a steam jacketed vacuum mixer. A vacuum of 23" is applied and low pressure steam passed through the jacket. Dehydration is complete when the temperature of the compound reaches 140° F. as measured by means of a thermocouple inside the mixer. The composition is then placed in a tray in a depth proportionate to the desired thickness of the fiberboard. The tray is placed between the platens of a press, which are heated to approximately 170° C., and a pressure of 2000 pounds per square inch is applied. A pressing time of five minutes is sufficient to produce a board of $\frac{1}{8}$" in thickness. If a board of greater thickness is desired the pressing time may be proportionately increased. The board hardens within the press and may be removed while hot.

In practice and for reasons of economy and efficiency a number of sheets are pressed simultaneously in a single press. The press may include as many as 21 vertical steam heated platens which are forced together by a movable pressure ram arranged beneath them.

Variability of particle size and fiber content is a unique property of cottonseed hulls. Particle size may be varied from 40 to 200 mesh. It has been determined that the comminuted hulls are composed of hull bran and hull fiber, the fiber content varying from 0 to 25%. The hull bran has a very low absorbing power while the hull fiber has an extremely high absorbing power. A composition consisting of hull bran alone results in a fiberboard of comparatively low mechanical strength. The incorporation of percentages of hull fiber with the hull bran results in increased mechanical strength, increased resistance to flexure and other stresses. The fiber content may be varied from 0 to 25% and the phenolic resin content may be varied up to approximately 17%. It will thus be seen that the properties of fiberboard manufactured according to this process may be varied through a wide range. Boards may be produced which are of high mechanical strength and rigidity. Conversely, a change in proportions will produce a more flexible board.

Due to the fact that no deteriorating preliminary treatment of the hulls is necessary the boards have an increased mechanical strength and resistance to flexure. As the cottonseed hulls contain oily constituents no lubrication is necessary in the press. Further, due to the characteristics of cottonseed hull lignin, the particles are very closely bound together with a resultant improved appearance and increase in strength.

The invention is susceptible of numerous embodiments and adaptations. The formula given in the specification is by way of illustration only and nothing in the specification is intended to limit the scope of the invention. Attention is directed to the appended claims for this purpose.

What is claimed is:

1. A method of forming fiberboard which comprises comminuting cottonseed hulls to produce hull bran of approximately 100 mesh size, adding to said bran a small percentage of hull fiber, mixing a small percentage of phenolic resin therewith and subjecting the resulting mass to heat and pressure until the resin is cured.

2. A method of forming fiberboard which comprises comminuting cottonseed hulls to 40 to 200 mesh, adding to said comminuted hulls hull fiber in the amount of approximately 10%, mixing therewith approximately 17% of phenolic resin, subjecting a layer of said mixture to heat and pressure until the product has hardened.

3. A method of forming fiberboard which comprises comminuting cottonseed hulls and hull fiber to approximately 100 mesh, the comminuted mass containing approximately 10% of hull fiber, adding thereto a phenolic resin in an amount less than 20% of the comminuted mass, subjecting a layer of said mixture to heat and pressure until the resin is cured.

4. A method of forming fiberboard which comprises comminuting cottonseed hulls and hull fiber to approximately 100 mesh, the comminuted mass containing from 0 to 25% of hull fiber, adding thereto a phenolic resin in an amount less than 20% of the comminuted mass, subjecting a layer of said mixture to a pressure of approximately 2000–4000 pounds per square inch at a temperature of approximately 170° C. until the resin is cured.

5. A method of forming fiberboard comprising comminuting cottonseed hulls and fiber to approximately 100 mesh, the comminuted mixture containing approximately 20% of hull fiber, adding thereto a phenolic resin in an amount less than 20%, subjecting a layer of the mixture to a pressure of 2000–4000 pounds per square inch at a temperature of 170° C. until the resin is cured and a homogeneous product formed.

FRITZ ROSENTHAL.